(12) United States Patent
Suzuki et al.

(10) Patent No.: US 8,983,525 B2
(45) Date of Patent: Mar. 17, 2015

(54) MOBILE COMMUNICATION SYSTEM, BASE STATION DEVICE, AND MOBILE COMMUNICATION TERMINAL

(75) Inventors: Shigeto Suzuki, Osaka (JP); Shinichi Sawada, Osaka (JP); Hirokazu Kobayashi, Osaka (JP); Koki Suzuki, Osaka (JP); Akio Yoshihara, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 221 days.

(21) Appl. No.: 13/583,012

(22) PCT Filed: Mar. 7, 2011

(86) PCT No.: PCT/JP2011/055229
§ 371 (c)(1),
(2), (4) Date: Sep. 17, 2012

(87) PCT Pub. No.: WO2011/111655
PCT Pub. Date: Sep. 15, 2011

(65) Prior Publication Data
US 2013/0035134 A1 Feb. 7, 2013

(30) Foreign Application Priority Data
Mar. 9, 2010 (JP) ................................. 2010-052211

(51) Int. Cl.
*H04W 48/16* (2009.01)
*H04W 48/08* (2009.01)
*H04W 84/04* (2009.01)

(52) U.S. Cl.
CPC ............ *H04W 48/08* (2013.01); *H04W 84/045* (2013.01)
USPC ........... 455/524; 455/411; 455/436; 455/434; 455/444

(58) Field of Classification Search
CPC ... H04W 48/08; H04W 84/045; H04W 48/00; H04W 48/16; H04W 48/18; H04W 48/20; H04W 48/10; H04W 48/12; H04W 48/14; H04W 52/00; H04W 52/02; H04W 52/04; H04W 84/047; H04W 88/00
USPC ......... 455/524, 553, 520, 458, 511, 450, 434, 455/179.1, 160.1, 186.1, 456.1, 3.06, 456.3, 455/3.02, 414.1, 422.1, 426.1, 436, 435.2, 455/435.1, 435.3, 439, 442; 370/312
See application file for complete search history.

(56) References Cited

U.S. PATENT DOCUMENTS 7,623,824 B2 * 11/2009 Anttila et al. ................. 455/3.06
2003/0003953 A1 * 1/2003 Houplain ....................... 455/553

(Continued)

FOREIGN PATENT DOCUMENTS

WO WO 2009/125799 A1 10/2009
WO WO 2010/073630 A1 7/2010

OTHER PUBLICATIONS

"3rd Generation Partnership Project; Technical Specification Group Services and System Aspects; Service accessibility (Release 9)," 3GPP TS 22.011, V9.3.0, Dec. 2009, pp. 1-23.

(Continued)

*Primary Examiner* — Tan Trinh
(74) *Attorney, Agent, or Firm* — Birch, Stewart, Kolasch & Birch, LLP

(57) ABSTRACT

A mobile communication system includes: a plurality of mobile communication terminals; and a first base station device configured to wirelessly communicate with the plurality of mobile communication terminals. The first base station device is configured to report to the plurality of mobile communication terminals that a second base station device allowing only a particular mobile communication terminal access is set to allow all the plurality of mobile communication terminals access, by transmitting using cell broadcast service, identification information of the second station device.

11 Claims, 15 Drawing Sheets

(56) References Cited

U.S. PATENT DOCUMENTS

| | | |
|---|---|---|
| 2004/0142706 A1* | 7/2004 | Kim et al. ............. 455/458 |
| 2004/0198279 A1* | 10/2004 | Anttila et al. ............. 455/179.1 |
| 2009/0219849 A1* | 9/2009 | Alpert et al. ............. 370/312 |
| 2010/0227611 A1* | 9/2010 | Schmidt et al. ............. 455/434 |
| 2011/0105085 A1 | 5/2011 | Aoyagi |
| 2011/0201343 A1* | 8/2011 | Pinheiro et al. ............. 455/450 |

OTHER PUBLICATIONS

"3rd Generation Partnership Project; Technical Specification Group Services and System Aspects; Service requirements for Home NodeBs and Home eNodeBs (Release10)," 3GPP TS 22.220, V10.1.0, Dec. 2009, pp. 1-23.

"3rd Generation Partnership Project; Technical Specification Group Terminals; Technical realization of Cell Broadcast Service (CBS) (Release 6)," 3GPP TS 23.041, V6.2.0, Dec. 2003, pp. 1-36.

* cited by examiner

| CSG_ID | BROADCAST FLAG | TERMINAL_ID |
|--------|----------------|-------------|
| 0123 | 1 | NO DATA |
| 0123 | 0 | 10008、10010 |
| 0246 | 1 | NO DATA |
| 0246 | 0 | 12345、12346 |
| ⋮ | ⋮ | ⋮ |

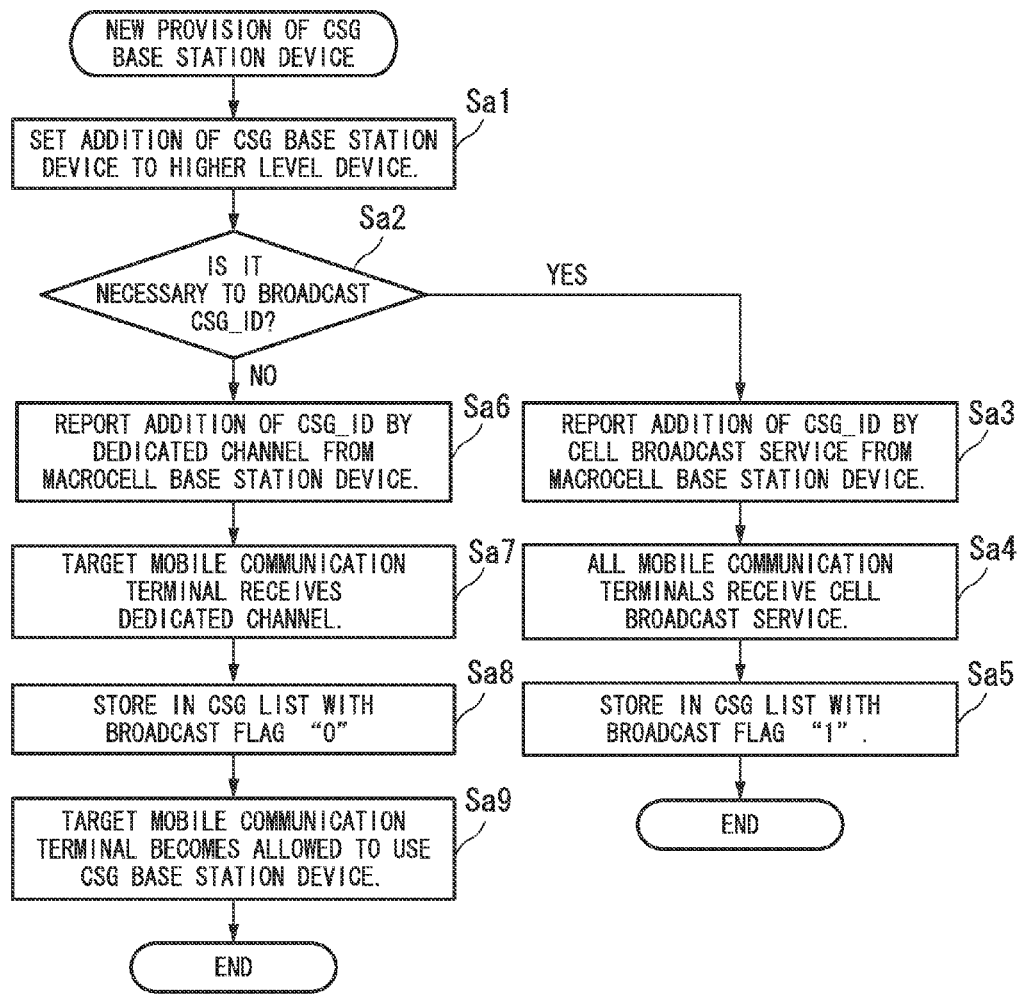

MOBILE COMMUNICATION SYSTEM, BASE STATION DEVICE, AND MOBILE COMMUNICATION TERMINAL

TECHNICAL FIELD

The present invention relates to a mobile communication system, a base station device, and a mobile communication terminal.

Priority is claimed on Japanese Patent Application No. 2010-052211, filed Mar. 9, 2010, the content of which is incorporated herein by reference.

BACKGROUND ART

Base station devices, standardization of which are currently in progress by 3GPP (3rd Generation Partnership Project), include: an (e)NodeB that serves macrocells (normal cells); and a Home (e)NodeB (Home (e)NB) that serves cells smaller than the macrocells. Cells served by the Home (e)NodeB include: an open cell to which all users are allowed access; a CSG cell (Closed Subscriber Group cell) which allows specific users to access thereto; and a hybrid cell having both characteristics of the open cell and the CSG cell. Requirements for the CSG cells are defined on the eighth section of Non-Patent Document 1.

A CSG_ID, which is unique identification information, is assigned to a CSG cell. According to Non-Patent Document 1, it is necessary to support at least 125 million CSG_IDs in PLMN (Public Mobile Land Network).

However, the number of CSG_IDs to be found in the PLMN by a terminal of a user is generally considered to be not so great. It is necessary for the terminal to determine whether or not the found CSG cell is an accessible cell. At this time, the terminal uses a CSG list (allowed CSG list) that is a list of accessible CSG cells and is stored in the terminal. The number of CSG cells varies over time. For this reason, it is necessary for the terminal to always have the latest list.

Non-Patent Documents 1 and 2 define the CSG list as follows.

The CSG list is stored in a USIM (Universal Subscriber Identity Module Card) of a UE (User Equipment: mobile communication terminal).

The CSG list is updated individually for each UE (the details of update procedures and update timings are not defined).

Information (CSG_ID, operation frequency, PCI (Physical Cell Identity), etc.) of CSG cells placed in a macrocell (normal cell) is managed by operators.

If a Home (e)NB is newly placed, operators can know the position thereof.

CITATION LIST

Non-Patent Document

[Non-Patent Document 1] 3GPP TS 22.011 V9.3.0: "Service accessibility"
[Non-Patent Document 2] 3GPP TS 22.220 V10.1.0: "Service requirements for Home NodeBs and Home eNodeBs"

DISCLOSURE OF THE INVENTION

Problems to be Solved by the Invention

Regarding the aforementioned (e)NodeB serving the macrocell, however, traffic is concentrated on a particular (e)No-deB for reasons such that a disaster, such as an earthquake, occurs causing some (e)NodeB to be inoperative, or that many users gather to attend an event or the like. For such reasons, there is a problem in that congestion occurs in a wireless path, that is, between the UE and the (e)NodeB.

The present invention has been made in view of such situations. An object of the present invention is to provide a wireless communication system that prevents congestion from occurring in a wireless path.

Means for Solving the Problems (1) The present invention has been made to solve the aforementioned problem. A mobile communication system of the present invention includes: a plurality of mobile communication terminals; and a first base station device configured to wirelessly communicate with the plurality of mobile communication terminals. The first base station device is configured to report to the plurality of mobile communication terminals that a second base station device allowing only a particular mobile communication terminal access is set to allow all the plurality of mobile communication terminals access, by transmitting using cell broadcast service, identification information of the second station device.

(2) Regarding the mobile communication system according to the present invention, the first base station device is configured to report to the plurality of mobile communication terminals that a setting that causes the second base station device to allow all the plurality of mobile communication terminals access is cancelled, by transmitting using cell broadcast service, the identification information of the second base station device released from the setting and information indicating cancellation.

(3) Regarding the mobile communication system according to the present invention, when the first base station device transmits using cell broadcast service, the identification information of the second base station device, the first base station device is configured to transmit using the cell broadcast service, the identification information of the second base station device set to allow all the plurality of mobile communication terminals access, among all of second base station devices positioned within a coverage area of the first base station device.

(4) Regarding the mobile communication system according to the present invention, each of the plurality of mobile communication terminals is configured to distinguishably store identification information of a second base station device to which the mobile communication terminal is allowed access, and the identification information of the second base station device transmitted using the cell broadcast service.

(5) Regarding the mobile communication system according to the present invention, the second base station device, which is reported by the first base station device as being set to allow all the plurality of mobile communication terminals access, is any one of a second base station device positioned within a coverage area of the first base station device, and a second base station device positioned within a coverage area of the first base station device and a base station device adjacent to the first base station device.

(6) A base station device of the present invention is configured to wirelessly communicate with a plurality of mobile communication terminals. The base station device is configured to report to the plurality of mobile communication terminals that another base station device allowing only a particular mobile communication terminal access is set to allow all the plurality of mobile communication terminals access, by transmitting identification information of the other base station device.

(7) A mobile communication terminal of the present invention is configured to wirelessly communicate with a first base station device that reports to a plurality of mobile communication terminals that a second base station device allowing only a particular mobile communication terminal access is set to allow all the plurality of mobile communication terminals access, by transmitting using cell broadcast service, identification information of the second base station device. The mobile communication terminal is configured to distinguishably store identification information of a second base station device to which the mobile communication terminal is allowed access, and the identification information of the second base station device transmitted using the cell broadcast service.

Effects of the Invention

According to the present invention, it is possible to prevent congestion from occurring in a wireless path.

BRIEF DESCRIPTION OF THE DRAWINGS

FIG. 13 is a diagram illustrating an example of a CSG list stored by the CSG list storing unit 231 according to the first embodiment.

FIG. 14 is a flowchart illustrating operation of the mobile communication system according to the first embodiment in a case where a CSG base station device is newly provided.

BEST MODE FOR CARRYING OUT THE INVENTION

Hereinafter, a first embodiment of the present invention is explained with reference to drawings. Regarding a mobile communication system according to the first embodiment, in a case where at the time of a disaster or the like, an already-provided base station device serving a CSG cell or a newly-provided base station device serving a CSG cell is set to allow any mobile communication terminal access thereto, identification information of that CSG cell is delivered by a cell broadcast service (CBS) function of the base station device serving a macrocell, thereby enabling a camping mobile communication terminal to access that CSG cell. Thereby, it is possible to avoid concentration of traffic on the base station device serving the macrocell and therefore preventing congestion from occurring.

Figure 1:
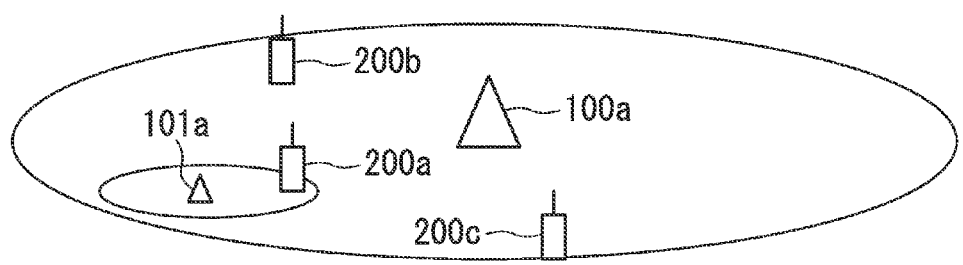
FIG. 1 is a (first) diagram illustrating an example of specific operation of a mobile communication system according to a first embodiment of the present invention.
Figure 2:
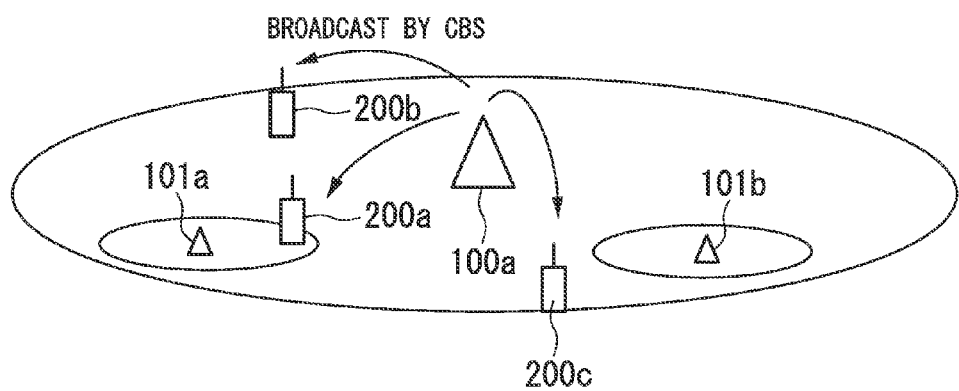
FIG. 2 is a (second) diagram illustrating an example of specific operation of the mobile communication system according to the first embodiment.
Figure 3:
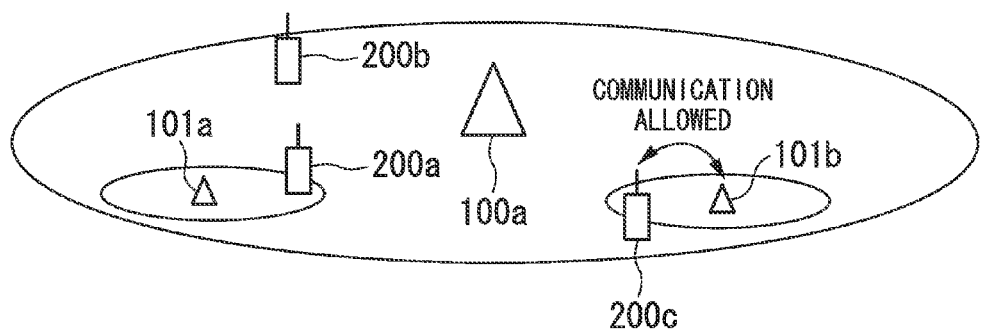
FIG. 3 is a (third) diagram illustrating an example of specific operation of the mobile communication system according to the first embodiment.

FIGS. 1, 2, and 3 are diagrams illustrating examples of specific operation of a mobile communication system including a macrocell base station device 100a and a CSG base station device 101a. As shown in FIG. 1, the CSG cell base station device 101a is installed in a macrocell served by the macrocell base station device 100a. A mobile communication terminal 200a is positioned in that CSG cell. Further, mobile communication terminals 200b and 200c are positioned in the aforementioned macrocell. In the case of FIG. 2, in a case where a disaster or the like occurs and traffic in the macrocell served by the macrocell base station device 100a increases, a CSG base station device 101b is placed so that any mobile communication terminal is allowed access thereto, in order to prevent concentration of traffic on the macrocell. Although the CSG base station device 101b is newly added (placed), the CSG base station device 101b is not included in the CSG list stored by each of the mobile communication terminals 200a, 200b, and 200c. For this reason, each of the mobile communication terminals 200a, 200b, and 200c determines that it is impossible to communicate with the CSG base station device 101b.

In the case of FIG. 2, upon recognizing that the CSG base station device 101b is added, the macrocell base station device 100a broadcasts by cell broadcast service, CSG_ID, which is identification information of the CSG base station device 101b, to the mobile communication terminals 200a, 200b, and 200c in that macrocell. Then, each of the mobile communication terminals 200a, 200b, and 200c receiving the cell broadcast service adds the delivered CSG_ID to the CSG list. Thereby, the mobile communication terminal 200c positioned close to the CSG base station device 101b becomes able to use the CSG base station device 101b.

Figure 4:
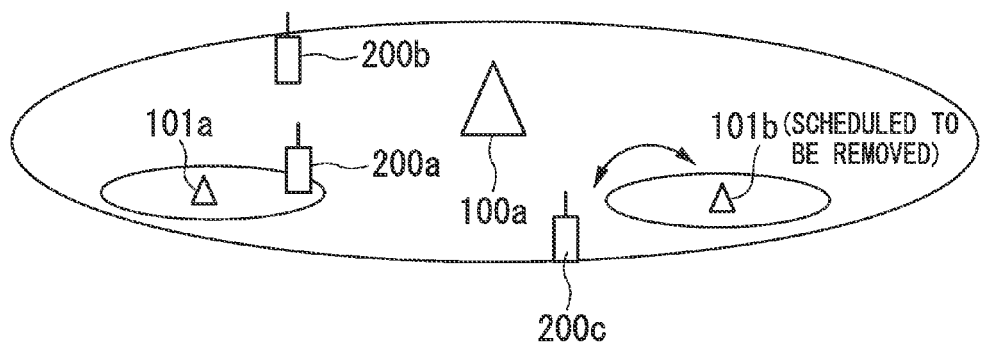
FIG. 4 is a (fourth) diagram illustrating an example of specific operation of the mobile communication system according to the first embodiment.
Figure 5:
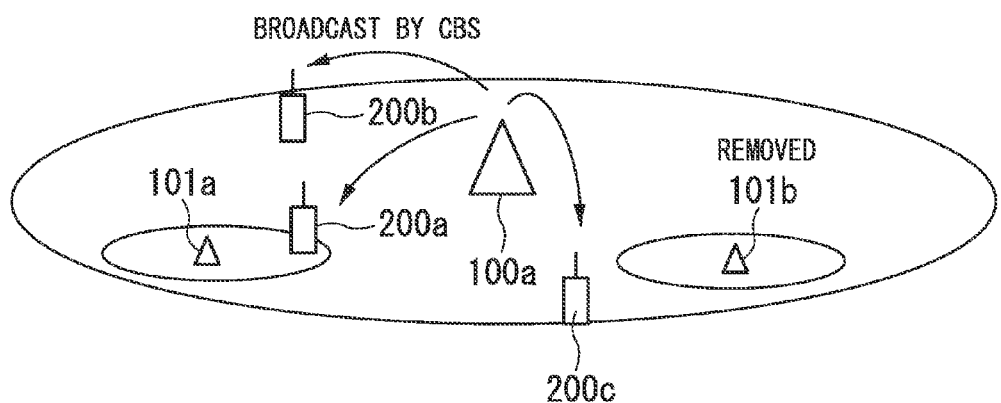
FIG. 5 is a (fifth) diagram illustrating an example of specific operation of the mobile communication system according to the first embodiment.
Figure 6:
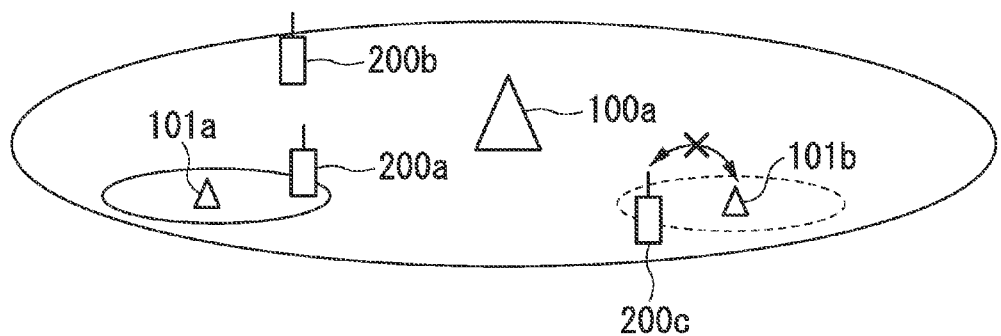
FIG. 6 is a (sixth) diagram illustrating an example of specific operation of the mobile communication system according to the first embodiment.

FIGS. 4, 5, and 6 are diagrams illustrating specific operation of the mobile communication system including the macrocell base station device 100a and the CSG base station devices 101a and 101b. As shown in FIG. 4, here, the CSG cell base station device 101a is placed in a cell served by the macrocell base station device 100a. The mobile communication terminal 200a is positioned in the CSG cell. The mobile communication terminals 200b and 200c are positioned in the macrocell. Here, explanation is given with respect to a case where when the CSG base station device newly placed in a service area of a wireless base station (macrocell) in such a manner as shown in FIGS. 1 to 3 or the already-provided CSG base station device is removed, or only a particular mobile communication terminal becomes allowed access thereto, the wireless base station delivers by cell broadcast service (CBS), a CSG_ID of the removed CSG base station device to mobile communication terminals camping on the service area.

As shown in FIG. 4, if there is the base station device 101b to be removed, the CSG_ID of that base station device 101b to be removed is still stored in the CSG lists of the mobile communication terminals 200a, 200b, and 200c. For this reason, the mobile communication terminal 200c positioned close to the base station device 101b tries to use the CSG base station device 101b. Then, upon recognizing that the CSG base station device 101b has been removed as shown in FIG. 5, the macrocell base station device 100a broadcasts by cell broadcast service, information indicating that the CSG_ID should be deleted, to the mobile communication terminals 200a, 200b, and 200c in that macrocell. Then, as shown in FIG. 6, the mobile communication terminals 200a, 200b, and 200c receiving the cell broadcast service recognize the CSG_ID of the deleted CSG base station device 101b, and deletes that CSG_ID from the CSG list. Thereby, even the mobile communication terminal 200c close to the CSG base station device 101b does not use the CSG base station device 101b any more.

Figure 7:
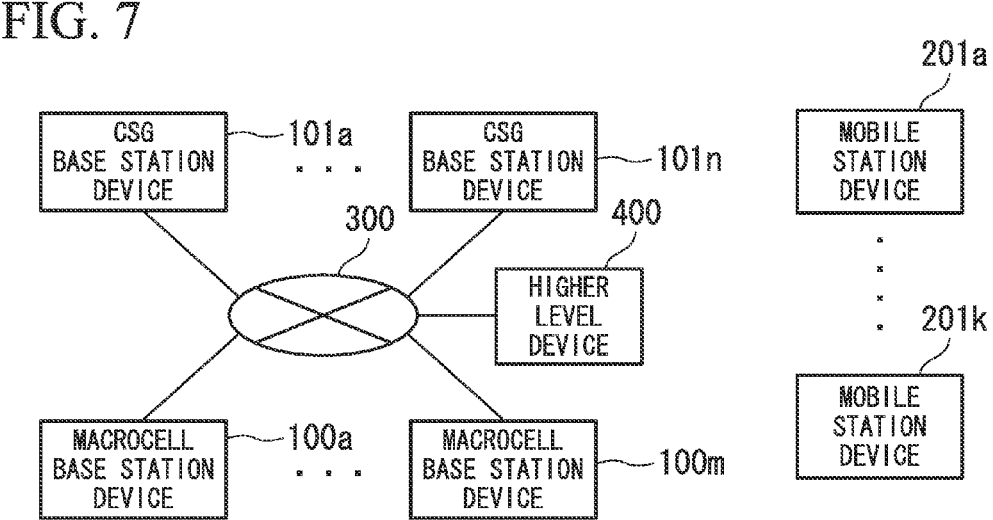
FIG. 7 is a schematic block diagram illustrating a configuration of the mobile communication system according to the first embodiment.

FIG. 7 is a schematic block diagram illustrating a configuration of the mobile communication system according to the first embodiment.

As shown in FIG. 7, the mobile communication system according to the first embodiment includes: macrocell base station devices 100a, . . . , 100m; CSG base station devices 101a, . . . , 101n; mobile communication terminals 201a, . . . , 201k; a network 300; and a higher level device 400. Each of the aforementioned devices shown in FIGS. 1 to 6 is described by extracting part of the devices in this mobile communication system according to the first embodiment.

The macrocell base station devices 100a, . . . , 100m are base station devices serving macrocells, which can communicate with all mobile communication terminals. As explained with reference to FIGS. 1 to 3, the macrocell base station devices 100a, . . . , 100m report to the mobile communication terminals that the CSG base station device is set to allow all the mobile communication terminals access thereto, by transmitting using cell broadcast service, the CSG_ID of the CSG base station device. Additionally, the macrocell base station devices 100a, . . . , 100m report to the mobile communication terminals that the setting that allows all the mobile communication terminals access is cancelled, by transmitting using cell broadcast service, the CSG_ID of the CSG base station device released from the setting.

Explanations have been given with reference to FIGS. 1 to 3, with respect to the case where the CSG base station device is newly placed, and is set to allow all the mobile communication terminals access thereto. However, even in a case where an already-placed CSG base station device is set to allow all the mobile communication terminals access thereto, the CSG_ID of that CSG base station device is transmitted using cell broadcast service, thereby reporting the setting to the mobile station devices. Similarly, explanations have been given with reference to FIGS. 4 to 6, with respect to the case where the CSG base station device set to allow all mobile communication terminals access thereto is removed. However, even in a case where only the setting that allows all the mobile communication terminals access is cancelled without removing the CSG base station device, the CSG_ID of that CSG base station device and information indicating the cancellation are transmitted using cell broadcast service, thereby reporting the cancellation to the mobile station devices.

The CSG base station devices 101a, . . . , 101n are base station devices serving CSG cells, which allow in normal operation, only particular mobile communication terminals of the mobile communication terminals 201a, . . . , 201k access thereto, and which allow in an emergency, all the mobile communication terminals access thereto upon receiving a notice from the higher level device 400. The particular mobile communication terminals are preliminarily set to the respective CSG base station devices 101a, . . . , 101n. The mobile communication terminals 201a, . . . , 201k communicate with the macrocell base station devices 100a, . . . , 100m and the CSG base station devices 101a, . . . , 101n. When the mobile communication terminals 201a, . . . , 201k communicate with any one of the CSG base station devices 101a, . . . , 101n, the mobile communication terminals 201a, . . . , 201k refer to the CSG lists stored in the respective mobile communication terminals 201a, . . . , 201k. If the CSG_ID of the CSG base station device to be communicated with is included in the CSG lists, the mobile communication terminals 201a, . . . , 201k determine that it is possible to communicate with that CSG base station device, and initiate communication with that CSG base station device. If the CSG_ID of the CSG base station device to be communicated with is not included in the CSG lists, the mobile communication terminals 201a, . . . , 201k determine that it is impossible to communicate with that CSG base station device, and therefore do not perform communication with that CSG base station device.

When an operator or another device sets to the higher device 400, an emergency such as occurrence of a disaster, or when the higher level device 400 detects an emergency, the higher level device 400 transmits to each CSG base station device, a release instruction notice that instructs each CSG base station device to allow all the mobile communication terminals access thereto. Additionally, when an emergency such as occurrence of a disaster is set to the higher level device 400, or when the higher level device 400 detects an emergency, the higher level device 400 transmits a release notice including the CSG_ID of the already-placed CSG base station devices, information indicating that addition of those CSG base station devices has occurred, and an instruction to allow all the mobile communication terminals communication therewith, to a macrocell base station device serving a macrocell (coverage area) in which those CSG base station devices are present. Here, the CSG base station devices to which the aforementioned release instruction notice is transmitted, and the CSG base station devices whose CSG_IDs are included in the release notice, may be set to be all the CSG base station devices already placed or CSG base station devices specified by an operator. Alternatively, if occurrence of a disaster is a factor, those CSG base station devices may be set to be CSG base station devices associated with the location of the disaster.

Further, when an operator sets to the higher level device 400, occurrence of addition or removal of a CSG base station device allowing all the mobile communication terminals communication therewith, or when another device reports to the higher level device 400, a CSG base station device to be added or removed, the higher level device 400 reports to the macrocell base station device serving the macrocell in which that CSG base station device is positioned, a release notice including information indicating that the CSG base station device allowing all the mobile communication terminals communication therewith has been added or removed, and the CSG_ID of that CSG base station device. Further, if a mobile communication terminal allowed to communicate with each CSG base station device is added or removed, the higher level device 400 reports to the macrocell base station device serving the macrocell in which that CSG base station device is placed, a CSG control notice including the CSG_ID of that CSG base station device and the terminal_ID, and information indicating the addition or removal, thereby reporting the occurrence of addition or removal.

Figure 8:
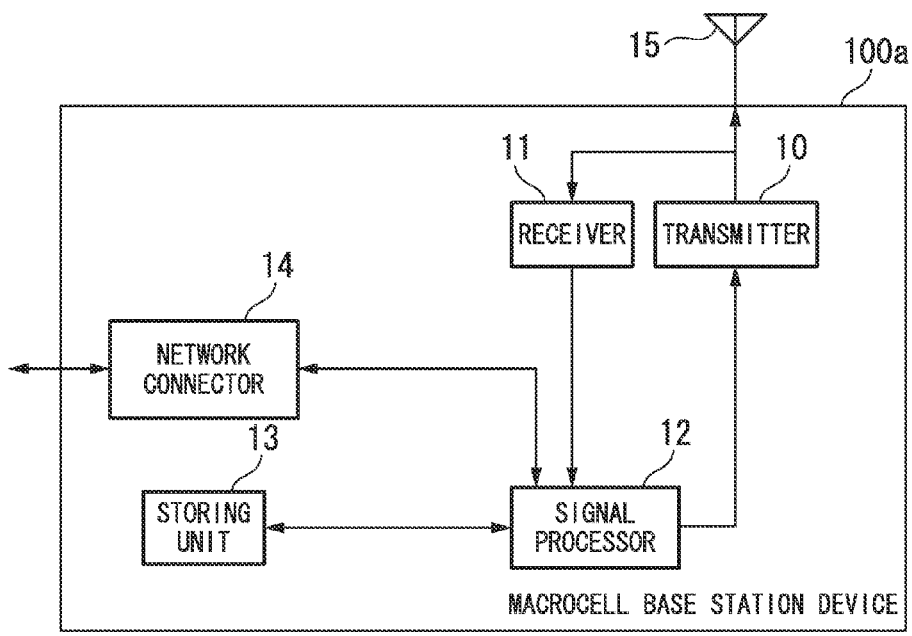
FIG. 8 is a schematic block diagram illustrating a configuration of a macrocell base station device 100a according to the first embodiment.

FIG. 8 is a schematic block diagram illustrating a configuration of the macrocell base station device 100a. The other macrocell base station devices 100b, 100c, . . . have the same configuration as that of the macrocell base station device 100a, and therefore explanations thereof are omitted here. The macrocell base station device 100a includes: a transmitter 10; a receiver 11; a signal processor 12; a storing unit 13; a network accessor 14; and an antenna 15. The transmitter 10 modulates transmission data received from the signal processor 12. Then, the transmitter 10 upconverts the modulated transmission data into wireless frequency signals, and then transmits the wireless frequency signals to the mobile communication terminals 201a, . . . , 201k via the antenna 15. The receiver 11 receives signals transmitted from the mobile communication terminals 201a, . . . , 201k via the antenna 15. Then, the receiver 11 downconverts the received signals into baseband frequency signals. Then, the receiver 11 demodulates the baseband frequency signals to generate reception data, and then outputs the reception data to the signal processor 12. The signal processor 12 controls, using the transmitter 10 and the receiver 11, communication with the mobile communication terminals 201a, . . . , 201k. Additionally, the signal processor 12 controls, using the network accessor 14, communication with a base station device and the higher level device 400, which are connected to the network 300. The storing unit 13 stores a CSG list that is a list of information relating to CSG base station devices placed in the service area of the macrocell base station device 100a.

Figures 9, 10:
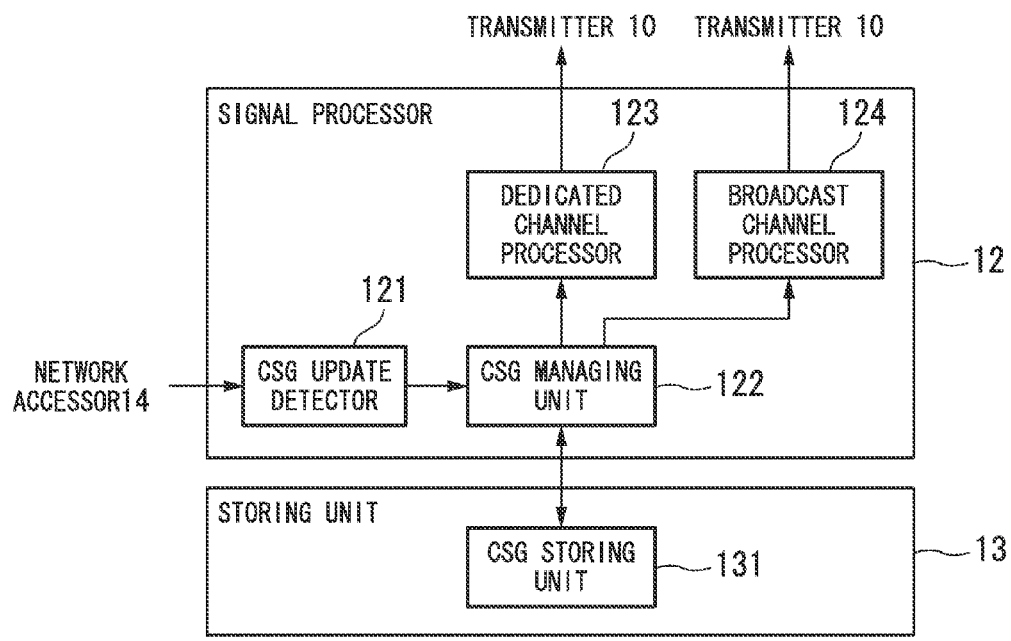
FIG. 9 is a schematic block diagram illustrating a configuration of a signal processor 12 and a storing unit 13 according to the first embodiment.
FIG. 10 is a diagram illustrating an example of contents stored in a CSG storing unit 131 according to the first embodiment.

FIG. 9 is a schematic block diagram illustrating a configuration of the signal processor 12 and the storing unit 13. The signal processor 12 includes: a CSG update detector 121; a CSG managing unit 122; a dedicated channel processor 123; and a broadcast channel processor 124. The CSG update detector 121 receives the release notice and the CSG control notice from the higher level device 400 via the network accessor 14, and outputs these notices to the CSG managing unit 122. Upon receiving the release notice and the CSG control notice, the CSG managing unit 122 updates the CSG storing unit 131 according to those notices. Additionally, upon receiving the release notice, the CSG managing unit 122 instructs the broadcast channel processor 124 to deliver the contents of the release notice. Further, upon receiving the CSG control notice, the CSG managing unit 122 instructs the dedicated channel processor 124 to deliver the contents of the CSG control notice to mobile communication terminals that are targets of the CSG control notice.

Upon receiving the instruction from the CSG managing unit 122, the dedicated channel processor 123 outputs to the transmitter 10, a signal that instructs the transmitter 10 to transmit an instruction to add or delete the CSG_ID to or from the CSG list, using the dedicated channel to the mobile communication terminal specified by the CSG control notice. Upon receiving the instruction from the CSG managing unit 122, the broadcast channel processor 124 outputs to the transmitter 10, a signal that instructs the transmitter 10 to transmit, using the broadcast channel, that is, the cell broadcast service, an instruction to add or delete the CSG_ID specified by the release notice.

The storing unit 13 includes the CSG storing unit 131. The CSG storing unit 131 stores the CSG list that correlates: a CSG_ID of a CSG base station device placed in the service area of the macrocell base station device 100a; a broadcast flag indicating whether or not that CSG_ID has been broadcast using cell broadcast service; and a terminal_ID that identifies a mobile communication terminal.

FIG. 10 is a diagram illustrating an example of contents stored in the CSG storing unit 131. The CSG storing unit 131 correlates and stores: the CSG_ID "0123"; the broadcast flag "1"; and the terminal_ID "no data." The CSG storing unit 131 correlates and stores: the CSG_ID "0123"; the broadcast flag "0"; and the terminal_ID "10008, 10010." In such a manner, the CSG storing unit 131 correlates and stores a CSG_ID, a broadcast flag, and a terminal_ID. Regarding the terminal_ID, there is data only if the broadcast flag is set to be "0", and there is no data if the broadcast flag is set to be "1". In other words, this is because, if the broadcast flag is set to be "1", it indicates that the CSG_ID has been reported using the broadcast channel based on the release notice, and if the CSG_ID has been reported using the broadcast channel, the CSG_ID has been reported to all the mobile communication terminals without specifying a mobile communication terminal. If the broadcast flag is set to be "0", it indicates that the CSG_ID has been reported based on the CSG control notice, using the dedicated channel for individually delivering to each mobile communication terminal, and if the CSG_ID has been reported using the dedicated channel, the terminal_ID is identification information of the mobile communication terminal to which the CSG_ID is reported.

Figure 11:
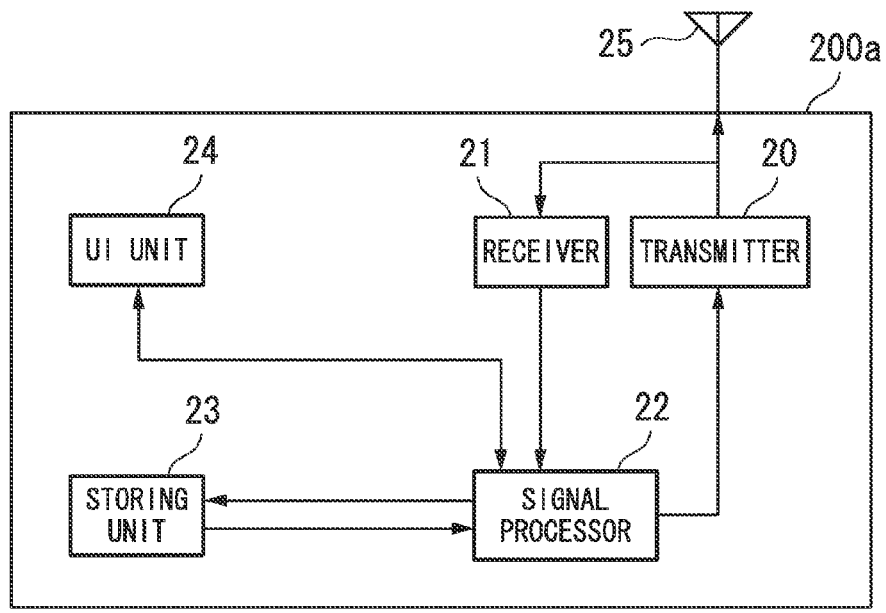
FIG. 11 is a schematic block diagram illustrating a configuration of a mobile communication terminal 200a according to the first embodiment.

FIG. 11 is a schematic block diagram illustrating a configuration of the mobile communication terminal 200a according to the first embodiment. The other mobile communication terminals 200b, 200c, . . . have the same configuration as that of the mobile communication terminal 200a, and therefore explanations thereof are omitted here. The mobile communication terminal 200a includes: a transmitter 20; a receiver 21; a signal processor 22; a storing unit 23; a UI (User Interface) unit 24; and an antenna 25. The transmitter 20 modulates a signal received from the signal processor 22, and upconverts the modulated signal into a wireless frequency signal. Then, the transmitter 20 transmits, via the antenna 25, the wireless frequency signal to the macrocell base station devices 100a, . . . , 100m, and the CSG base station devices 101a, . . . , 101n. The receiver 21 receives signals from the macrocell base station devices 100a, . . . , 100m, and the CSG base station devices 101a, . . . , 101n. Then, the receiver 21 downconverts the received signals into baseband frequency signals, and then demodulates the baseband frequency signals.

The UI unit 24 includes: key buttons for receiving an input by user operation, such as key buttons for inputting numbers or characters; key buttons for instructing four directions or for selecting an option; and a microphone for inputting audio sound. The UI unit 24 outputs to the signal processor 22, transmission data or operation instructions input via these key buttons. The UI unit 24 further includes: a display for providing a user with information by an image, such as a liquid crystal display or an organic EL display; and a speaker for providing a user with information by audio sound. The UI unit provides a user with data received from the signal processor 22. According to the instruction received by user operation via the UI unit 24, the signal processor 22 controls, using the transmitter 20 and the receiver 21, communication with the macrocell base station devices 100a, . . . , 100m, and the CSG base station devices 101a, . . . , 101n. The storing unit 23 stores a CSG list. Here, the CSG list is a list that correlates identification information (CSG_ID) of the CSG base station device to which the mobile communication terminal 200a is accessible, and information indicating whether or not that CSG_ID has been reported by the broadcast channel.

Figure 12:
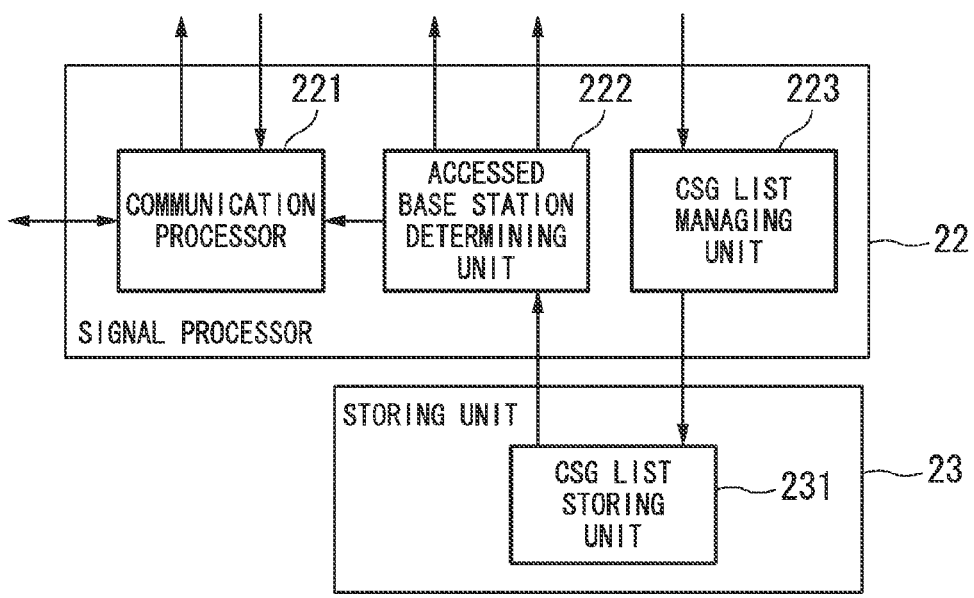
FIG. 12 is a schematic block diagram illustrating a configuration of a signal processor 22 and a storing unit 23 according to the first embodiment.

FIG. 12 is a schematic block diagram illustrating a configuration of the signal processor 22 and the storing unit 23. The signal processor unit 22 includes: a communication processor 221; an accessed base station determining unit 222; and a CSG list managing unit 223. The storing unit 23 includes a CSG list storing unit 231. The communication processor 221 relays transmission data between the UI unit 24 and transmission unit 20 and relays reception data between the UI unit 24 and the receiver 21. Additionally, the communication processor 221 generates control data that controls communication with the base station device determined by the accessed base station determining unit 222, and outputs the generated control data to the transmitter 20. Further, the communication processor 221 receives from the receiver 21, control data transmitted from that base station device. The accessed base station determining unit 222 determines a base station to access, based on the reception level of the signal received from each base station device or the CSG list stored by the CSG list storing unit 231. Then, the accessed base station determining unit 222 reports the determined base station to the communication processor 221. Additionally, the accessed base station determining unit 222 sets to the transmitter 20 and the receiver 21, a frequency to be used for communicating with the determined base station device.

The CSG list managing unit 223 receives from the receiver 21, the notice of addition or deletion of the CSG_ID, which is transmitted from the macrocell base station device, and updates the CSG list stored by the CSG list storing unit 231.

When the CSG list managing unit 223 stores the CSG_ID in the CSG list, the CSG list managing unit 223 stores the CSG_ID while correlating to the CSG_ID, whether the notice has been given by the broadcast channel or the dedicated channel. Upon receiving the notice of deletion of the CSG_ID from the macrocell base station device, if that notice has been given by the dedicated channel, the CSG list managing unit 223 deletes from the CSG list, the corresponding CSG_ID added according to the notice given through the dedicated channel. If that notice has been given by the broadcast channel, the CSG list managing unit 223 deletes from the CSG list, the corresponding CSG_ID added according to the notice given through the broadcast channel.

The CSG list storing unit 231 stores a CSG list that correlates the CSG_ID of the CSG base station device to which the mobile communication terminal is allowed access, and information indicating whether the notice of that allowed CSG_ID has been reported by the broadcast channel or the dedicated channel. FIG. 13 is a diagram illustrating an example of the CSG list stored by the CSG list storing unit 231. As shown in FIG. 13, a CSG_ID, and a broadcast flag indicating whether the notice of the CSG_ID has been reported by the broadcast channel or the dedicated channel, are correlated and stored in the CSG list.

In the example shown in FIG. 13, the CSG_ID "0123" and the broadcast flag "1" indicating that the notice of that CSG_ID has been reported by the broadcast channel, are correlated and stored. Similarly, the CSG_ID "0123" and the broadcast flag "0" indicating that the notice of that CSG_ID has been reported by the dedicated channel, are correlated and stored. Additionally, the CSG_ID "0246" and the broadcast flag "1" are correlated and stored. Further, the CSG_ID "0492" and the broadcast flag "1" are correlated and stored. By correlating the CSG_ID to the broadcast flag in this manner, the CSG_ID of the CSG base station device to which the mobile communication terminal is allowed access, and the CSG_ID of the CSG base station device which has been transmitted using cell broadcast service are distinguishably stored. Here, instead of providing the broadcast flag, a region for storing the CSG_ID of the CSG base station device to which the mobile communication terminal is allowed access, and a region for storing the CSG_ID of the CSG base station device which has been transmitted using cell broadcast service, may be provided separately, so that these CSG_IDs are distinguishably stored.

FIG. 14 is a flowchart illustrating operation of the mobile communication system according to the first embodiment when a CSG base station device is newly provided. If a CSG base station device is newly provided, and addition of the CSG base station device is set to the higher level device 400 by, for example, a notice from the provided CSG base station device (Sa1), the higher level device 400 determines whether or not it is necessary to broadcast the CSG_ID of the added CSG base station device (Sa2).

If it is in an emergency, and the setting is such that allows all mobile communication terminals access to the added CSG base station device, it is determined that broadcasting is necessary (Sa2-Y), and the operation proceeds to step Sa3. In step Sa3, the higher level device 400 transmits to the macrocell base station device, a release notice including the CSG_ID of the added CSG base station device and information indicating the addition. The macrocell base station device receiving this notice reports the addition of the CSG_ID using cell broadcast service. All mobile communication terminals positioned within the service area of this macrocell base station device receive that cell broadcast service (Sa4). Then, all the mobile communication terminals store in the respective CSG lists, the reported CSG_ID while correlating the reported CSG_ID to the broadcast flag "1" (Sa5), and the operation ends. Thereby, all the mobile communication terminals become able to use the newly-provided CSG base station device.

On the other hand, at the determination in step Sa2, if it is in normal operation, and the setting is such that allows only a particular mobile communication terminal to use the added CSG base station device, it is determined that broadcasting is not necessary (Sa2-N), the operation proceeds to step Sa6. In step Sa6, the higher level device 400 transmits to the macrocell base station device, a CSG control notice including: the CSG_ID of the added CSG base station device; information indicating the addition; and a terminal_ID of a mobile communication terminal allowed to use the CSG base station device. The macrocell base station device receiving this notice reports addition of the CSG_ID included in the CSG control notice, through the dedicated channel addressed to the mobile communication terminal associated with the terminal_ID included in the CSG control notice. The mobile communication terminal that is the target of the dedicated channel receives this notice (Sa7). Then, the mobile communication terminal stores the reported CSG_ID in its CSG list while correlating the reported CSG_ID to the broadcast flag "0" (Sa8), and then the operation ends. Thereby, only the mobile communication terminal receiving the notice of the addition of the CSG_ID through the dedicated channel become able to use the CSG base station device associated with that CSG_ID.

Figure 15:
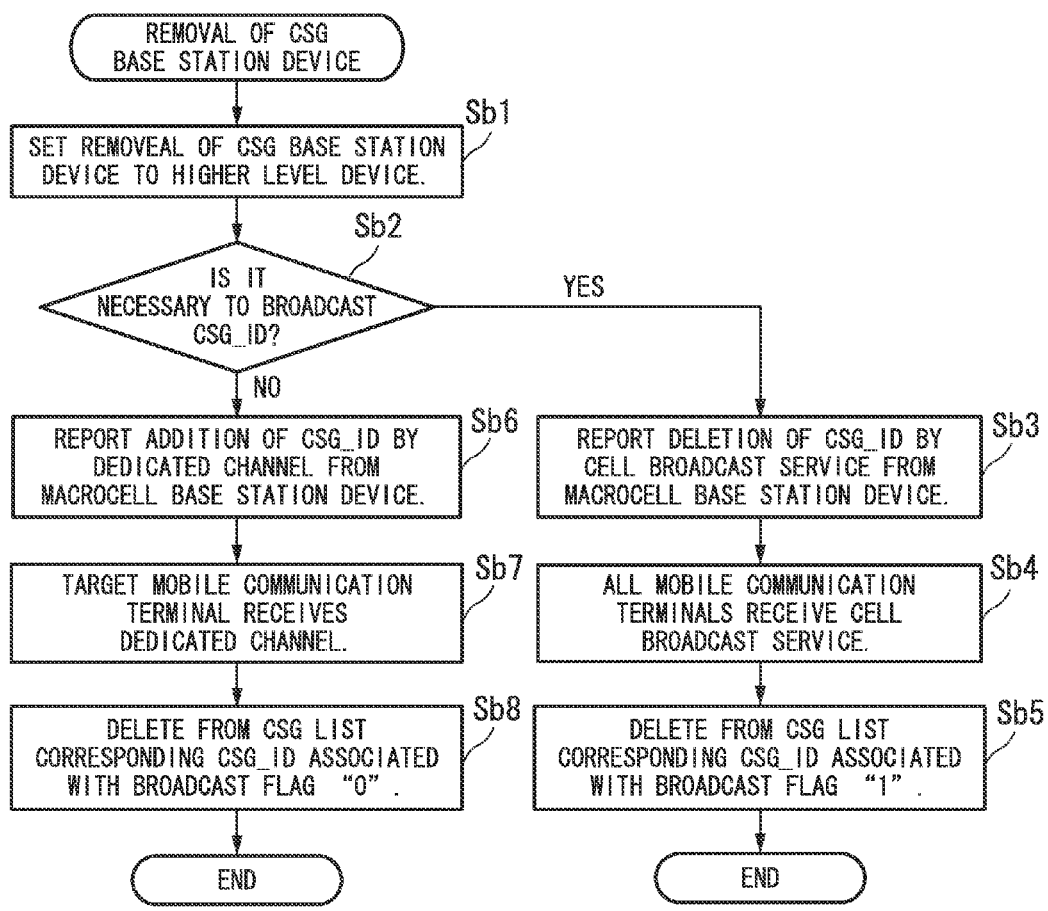
FIG. 15 is a flowchart illustrating operation of the mobile communication system according to the first embodiment in a case where a CSG base station device is removed.

FIG. 15 is a flowchart illustrating operation of the mobile communication system according to the first embodiment when the CSG base station device is removed. If the CSG base station device is removed, and removal of the CSG base station device is set to the higher level device 400 by, for example, a notice from the CSG base station device to be removed (Sb1), the higher level device 400 determines whether or not it is necessary to broadcast the CSG_ID of the CSG base station device to be removed (Sb2).

If it is in an emergency, and a setting is such that causes the CSG base station device to be removed to allow all mobile communication terminals to use the CSG base station device, it is determined that broadcasting is necessary (Sb2-Y), the operation proceeds to step Sb3. In step Sb3, the higher level device 400 transmits to the macrocell base station device, a release notice including the CSG_ID of the CSG base station device to be removed and information indicating the deletion. The macrocell base station device receiving this notice reports the deletion of the CSG_ID using cell broadcast service. All mobile communication terminals positioned within the service area of this macrocell base station device receive this cell broadcast service (Sb4), and delete from the respective CSG lists, the reported CSG_ID which is stored while being correlated to the broadcast flag "1" (Sb5), and the operation ends. Thereby, all the mobile communication terminals become unable to use the CSG base station device to be removed.

On the other hand, at the determination in step Sb2, if it is in the normal mode, and the setting is such that causes the CSG base station device to be removed to allow only a particular mobile communication terminal to use the CSG base station device, it is determined that broadcasting is not necessary (Sb2-N), the operation proceeds to step Sb6. In step Sb6, the higher level device 400 transmits to the macrocell base station device, a CSG control notice including: the CSG_ID of the CSG base station device to be removed; information indicating the deletion; and the terminal_ID of the mobile communication terminal allowed to use that CSG base station device. The macrocell base station device receiving this notice reports through the dedicated channel, the deletion of the CSG_ID included in the CSG control notice. The mobile communication terminal which is the target of the dedicated channel receives this notice (Sb7), and deletes from its CSG list, the reported CSG_ID which is stored while being correlated to the broadcast flag "0" (Sb8), and the operation ends. Thereby, the mobile communication terminal set to be allowed communication with the CSG base station device to be removed is given the notice of the deletion of that CSG_ID through the dedicated channel, and becomes unable to use the CSG base station device to be removed.

Here, if the CSG list storing unit 231 has no room in its storing region when the CSG_ID is added to the CSG list, the CSG list managing unit 223 may overwrite the CSG_ID beginning with the chronologically oldest CSG_ID of the reported CSG_IDs, or with the lowest use CSG_ID. Alternatively, the CSG_ID selected by a user may be overwritten.

Thus, the macrocell base station device reports using cell broadcast service, the CSG base station devices set to allow all the mobile communication terminals access thereto. Therefore, the mobile communication terminals become able to communicate those CSG base station devices, thereby suppressing concentration of traffic on the macrocell base station device and preventing congestion from occurring in the wireless path.

Hereinafter, a second embodiment of the present invention is explained with reference to drawings. In the first embodiment, the CSG_ID of the CSG base station device set to allow all mobile communication terminals access thereto, and the CSG_ID of the CSG base station device released from that setting, are transmitted using cell broadcast service. In the second embodiment, an explanation is given with respect to a case where the CSG_ID of the CSG base station device having been set to allow all mobile communication terminals access thereto is transmitted using cell broadcast service. A mobile communication system of the second embodiment has the same configuration as that of the mobile communication system of the first embodiment, but differs in that macrocell base station devices 102a, ..., 102m are included therein in lieu of the macrocell base station devices 100a, ..., 100m of the first embodiment. Additionally, the macrocell base station devices 102a, ..., 102m differ from the macrocell base station devices 100a, ..., 100m in that a signal processor 12a is included therein in lieu of the signal processor 12.

Figure 16:
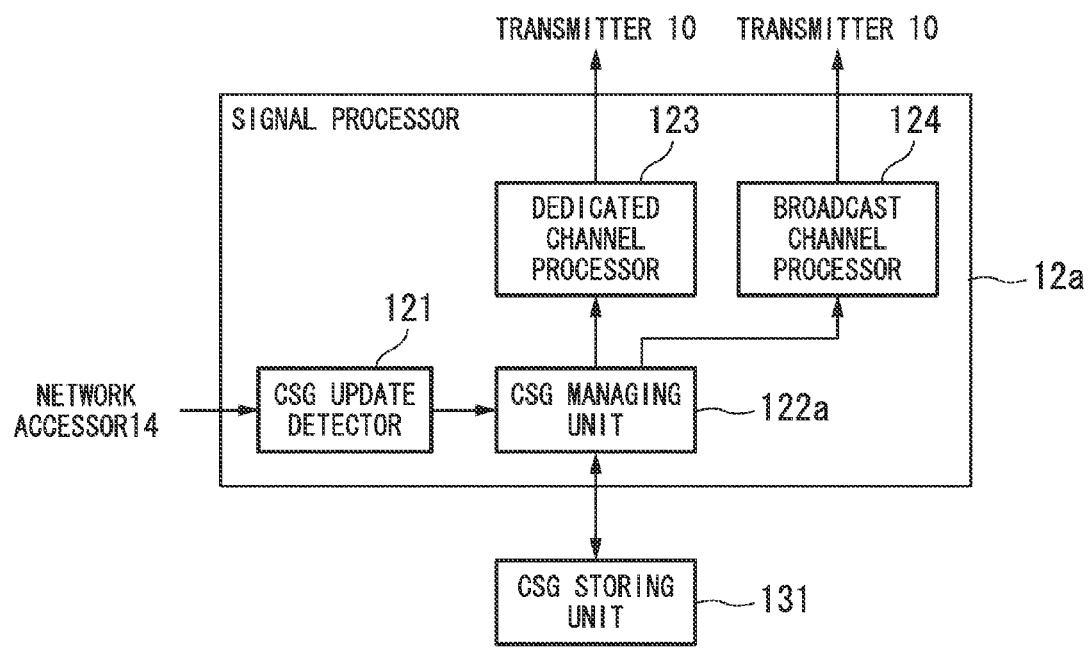
FIG. 16 a schematic block diagram illustrating a signal processor 12a according to a second embodiment of the present invention.

FIG. 16 is a schematic block diagram illustrating a configuration of the signal processor 12a according to the second embodiment.

The signal processor 12a differs from the signal processor 12 of the first embodiment in that a CSG managing unit 122a is included therein in lieu of the CSG managing unit 122. The signal processor 12a includes: the CSG update detector 121; a CSG managing unit 122a; the dedicated channel processor 123; and the broadcast channel processor 124. In FIG. 16, the same reference numerals (121, 123, and 124) are appended to units corresponding to those shown in FIG. 9, and explanations thereof are omitted here.

The CSG managing unit 122a periodically instructs the broadcast channel processor 124 to deliver the CSG_ID that is stored by the CSG storing unit 131 while being correlated with the broadcast flag "1." Additionally, upon receiving the release notice and the CSG control notice, the CSG managing unit 122a updates the CSG storing unit 131 according to these notices. Further, upon receiving the CSG control notice, the CSG managing unit 122a instructs the mobile communication terminals, which are the targets of the CSG control notice, to deliver the contents of the CSG control notice.

An example of operation of the mobile communication system of the second embodiment is explained here. Upon receiving a release notice that sets a CSG cell newly-placed or already-placed within macrocells served by the macrocell base station devices 102a, ..., 102m to allow all mobile communication terminals access thereto, the macrocell base station devices 102a, ..., 102m transmit using cell broadcast service to all the mobile communication terminals camping on those macrocells, the CSG_IDs of the CSG base station devices set at that time to allow all the mobile communication terminals access thereto. For example, in a case where the CSG_ID of the CSG base station device newly placed in the macrocell served by the macrocell base station device 102a is "8421", for example, there are two CSG base station devices originally placed therein, and the CSG_IDs of those two CSG base station devices are "0123, 0124", the CSG_IDs transmitted by the macrocell base station device 102 using cell broadcast service are "0123, 0124, 8421" which are obtained by adding "8421" to the original CSG_IDs "0123, 0124".

Thus, even in a case where the macrocell base station device is configured to report using cell broadcast service, the CSG base station devices which are placed in the macrocell served by the macrocell base station device and are set to allow all mobile communication terminals access thereto, the mobile communication terminals become able to communicate with those CSG base station devices, similarly to the first embodiment. Thereby, it is possible to suppress concentration of traffic on the macrocell base station device and to prevent congestion from occurring in the wireless path.

Third Embodiment

Hereinafter, a third embodiment of the present invention is explained with reference to drawings. In the third embodiment, the CSG_IDs of the CSG base station devices in the macrocell to which a mobile communication terminal belongs, and the CSG_IDs of the CSG base station devices in a macrocell close to that macrocell, are transmitted to the mobile communication terminal. Here, the range of the closeness is determined by the macrocell base station device or the higher level device. For example, the macrocell base station device or the higher level device preliminarily stores, for each macrocell, a list of macrocells close to that macrocell, and determines a neighboring macrocell. Thereby, it is possible to avoid delivering the CSG_IDs of the CSG base station devices, with which wireless communication is difficult (radio waves cannot reach, or access is impossible) since macrocells are distanced from each other.

A mobile communication system according to the third embodiment has the same configuration as that of the mobile communication system of the first or second embodiment. In the third embodiment, macrocell base station devices are referred to as macrocell base station devices $103a, \ldots, 103m$.

Figure 17:
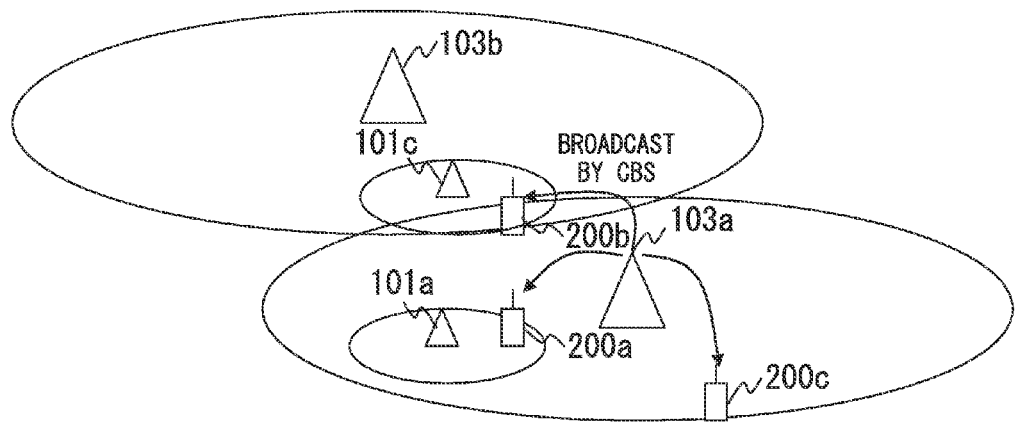
FIG. 17 is a diagram illustrating an example of specific operation of a mobile communication system according to a third embodiment of the present invention.
Figure 18:
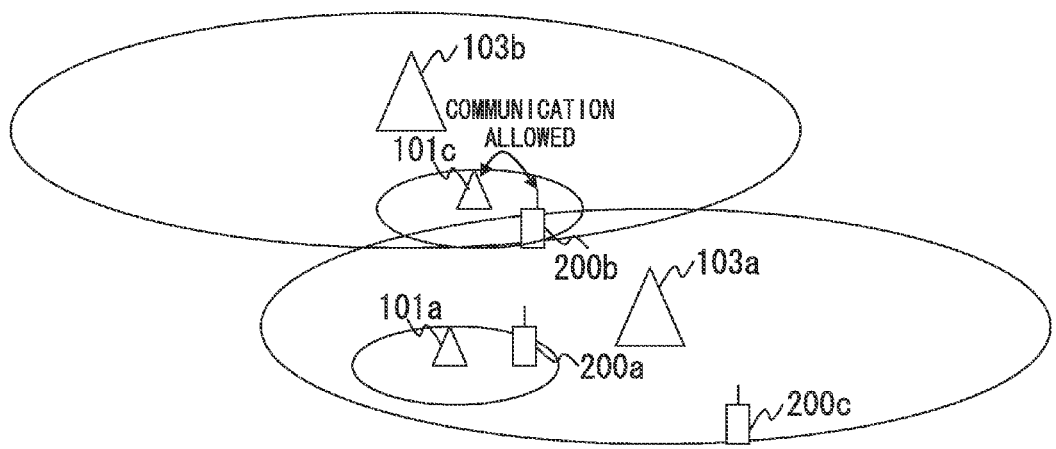
FIG. 18 is a diagram illustrating another example of specific operation of a mobile communication system according to the third embodiment.

FIGS. 17 and 18 are diagrams illustrating specific operation of the mobile communication system according to the third embodiment of the present invention. As shown in FIG. 17, a CSG cell base station device 101a is placed in a macrocell served by a macrocell base station device 103a (the macrocell base station device 100a in the case of FIG. 1). A mobile communication terminal 200a is positioned in a CSG cell served by the macrocell base station device 103a. Mobile communication terminals 200b and 200c are further positioned in that macrocell. In FIG. 17, a CSG cell base station device 101c is placed in a macrocell base station device 103b close to the macrocell served by the macrocell base station device 103a. This CSG cell base station device 101c may be one previously placed, or one placed to prevent concentration of traffic on the macrocell served by the macrocell base station device 103a or 103b when a disaster or the like occurs and the traffic in the macrocell increases.

In FIG. 17, if the CSG base station device 101c is added, the CSG base station device 101c reports to the higher level device 400, the CSG_ID that is the identification information of the CSG base station device 101c. The higher level device 400 reports the reported CSG_ID to the macrocell base station device 103a. The macrocell base station device 103a broadcasts using cell broadcast service, to the mobile communication terminals 200a, 200b, and 200c in the macrocell served thereby, the CSG_ID that is the identification information of the reported CSG base station device 101c. Then, as shown in FIG. 18, the mobile communication terminals 200a, 200b, and 200c receiving the cell broadcast service adds the delivered CSG_ID to the CSG list. Thus, the mobile communication terminal 200b positioned close to the CSG base station device 101c becomes able to use the CSG base station device 101c serving the macrocell other than the serving macrocell.

Figure 19:
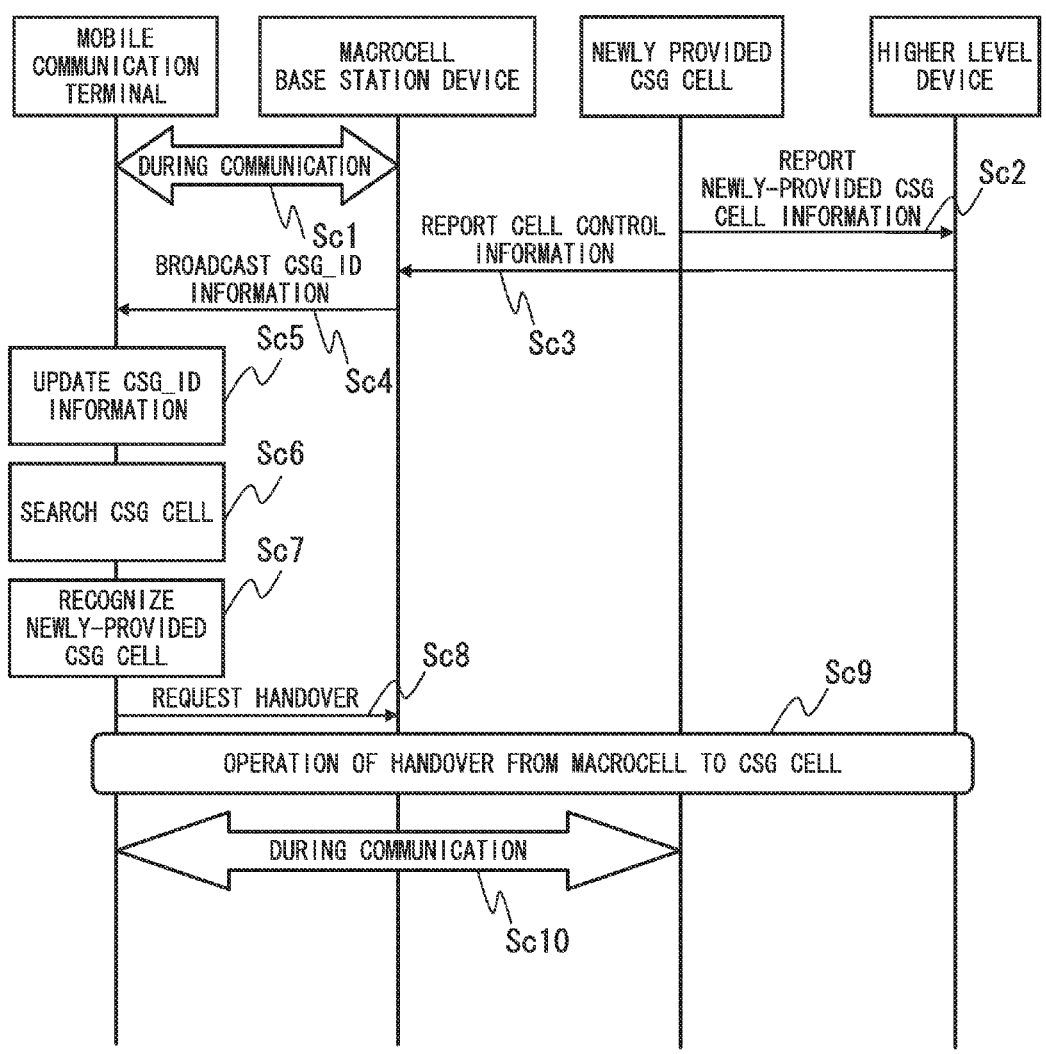
FIG. 19 is a sequence chart illustrating operation of the mobile communication system according to the third embodiment.

FIG. 19 is a sequence chart illustrating a mobile communication system according to the third embodiment. The mobile communication terminal 200b is in communication with the macrocell base station device 103a (Sc1). The CSG base station device 101c is newly placed in the macrocell served by the macrocell base station device 103b, and for example, by a notice from the placed CSG base station device 101c, addition of the CSG base station device is set to the higher level device 400 (Sc2). This notice may be given via the macrocell base station device 103b.

The higher level device 400 reports to the macrocell base station device 103a close to the macrocell base station device 103b, a CSG control notice including the CSG_ID of the added CSG base station device 101c (Sc3). The macrocell base station device 103a reports using cell broadcast service, addition of the reported CSG_ID of the CSG base station device 101c (Sc4). All mobile communication terminals positioned within the service area of that macrocell base station device 103a receive that cell broadcast service, and store in their respective CSG lists, the reported CSG_ID while correlating the reported CSG_ID to the broadcast flag "1" (Sc5).

For example, the mobile communication terminal 200b performs cell search using the reception quality for the CSG base station device corresponding to CSG_ID included in the CSG list (Sc6). In other words, even in a case where the mobile communication terminal 200b is allowed to communicate with both the macrocell and the CSG cell, and stores the reception qualities for both the macrocell and the CSG cell, the mobile communication terminal 200b preferentially uses the reception quality for the CSG cell, and thereby preferentially selects the CSG cell. The mobile communication terminal 200b obtains the reception quality for the CSG base station device 101c corresponding to the added CSG_ID (Sc7). If this reception quality is equal to or higher than a predetermined threshold, the mobile communication terminal 200b determines to perform handover to the CSG base station device 101c. The mobile communication terminal 200b transmits to the macrocell base station device 103a, a request for handover to the CSG base station device 101c. The mobile communication terminal 200b, the macrocell base station device 103a, the higher level device 400, the macrocell base station device 103b, and the CSG base station device 101c communicate with one another to cause the mobile communication terminal 200b to perform handover to the CSG base station device 101c (Sc9). The mobile communication terminal 200b communicates with the CSG base station device 101c (Sc10).

Hereinafter, a specific example of operation of each device shown in FIG. 19 is explained.

Figure 20:
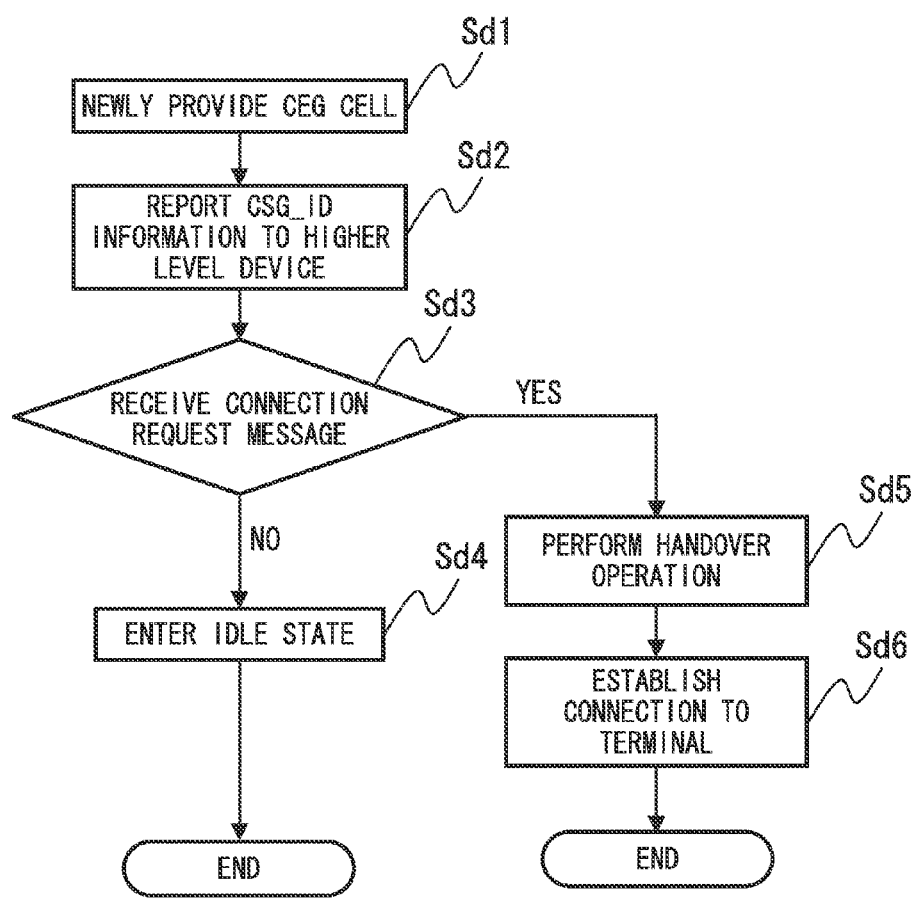
FIG. 20 is a flowchart illustrating operation of a CSG base station device 101c according to the third embodiment.

FIG. 20 is a flowchart illustrating operation of the CSG base station device 101c according to the third embodiment. The CSG base station device 101c is newly placed (Sd1), and for example, the placed CSG base station device 101c reports the CSG_ID thereof to the higher level device 400 (Sd2). Thereafter, if an access request message (for example, a handover request message) is not received (Sd3-N), the CSG base station device 101c enters an idle state (Sd4). On the other hand, if an access request message is received (Sd3-Y), the CSG base station device 101c performs handover operation (Sd5), and establishes connection to the mobile communication terminal 200b (Sd6).

Figure 21:
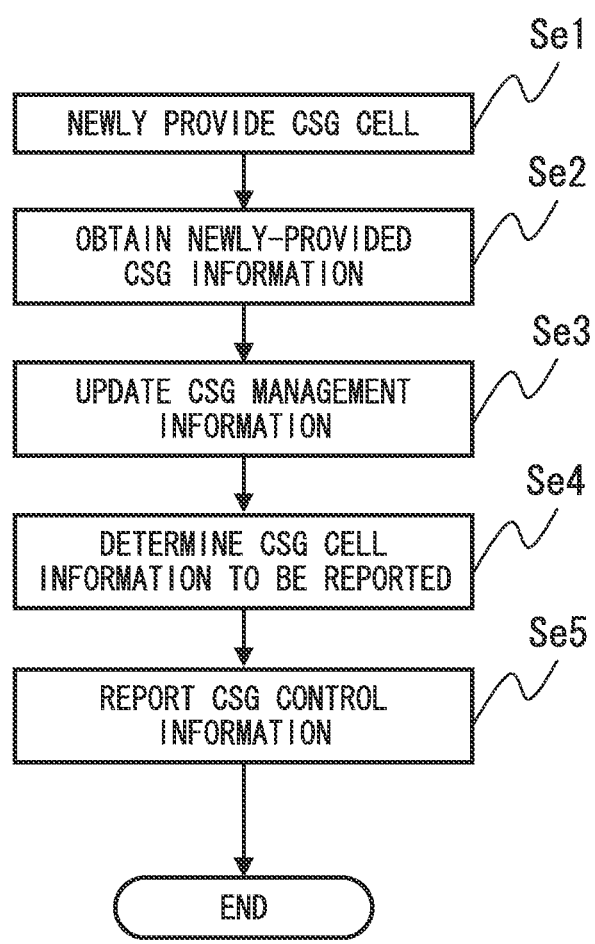
FIG. 21 is a flowchart illustrating operation of a higher level device 400 according to the third embodiment.

FIG. 21 is a flowchart illustrating operation of the higher level device 400 (for example, an MME or a HeNB gateway) according to the third embodiment. If the CSG base station device 101c is newly placed (Se1), the higher level device 400 obtains the CSG_ID of the placed CSG base station device 101c (Se2). The higher level device 400 preliminarily stores, as CSG management information, CSG_IDs of the CSG cells in the macrocell and cell IDs of neighboring macrocells, for each macrocell identification information (cell ID). The higher level device 400 correlates the CSG_ID of the CSG base station device 101c to the cell ID of the macrocell base station device 103b, and thereby updates the CSG management information (Se3). If addition of the CSG base station device is set to the higher level device 400 in this manner, the higher level device 400 determines whether or not it is necessary to broadcast the CSG_ID of the added CSG base station device (Se4). If it is determined that broadcasting is necessary, the operation proceeds to step Se5, in which the higher level device 400 reports a CSG control notice including the CSG_ID of the CSG base station device 101c to the macrocell base station device 103b, and the macrocell base station device 103a close to the macrocell base station device 103b (Se5).

Figure 22:
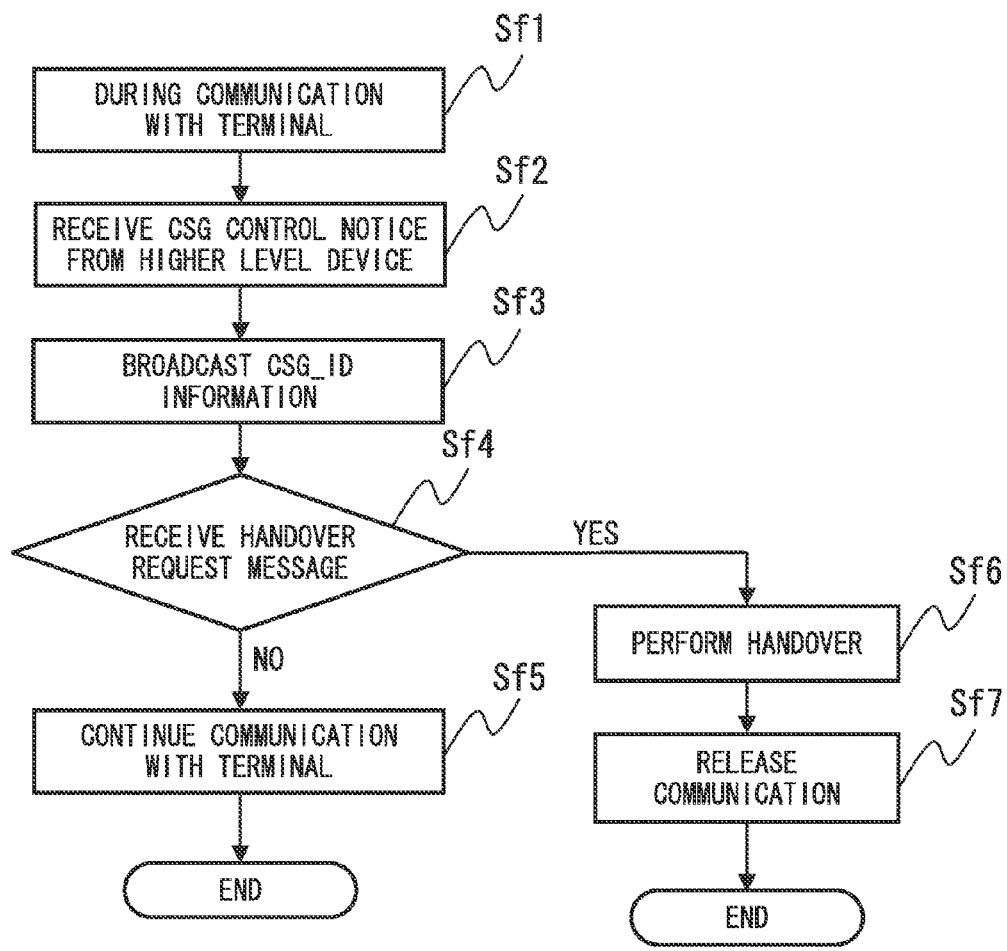
FIG. 22 is a flowchart illustrating operation of a macrocell base station device 103a according to the third embodiment.

FIG. 22 is a flowchart illustrating operation of the macrocell base station device 103a according to the third embodiment. The macrocell base station device 103a is in communication with the mobile communication terminal 200b (Sf1). The macrocell base station device 103a receives a CSG control notice from the higher level device 400 (Sf2), and broadcasts the CSG_ID included in the received CSG control notice (Sf3). Here, the macrocell base station device 103a may unicast to the individual mobile communication terminal 200b, the CSG_ID included in the received CSG control notice. Additionally, regarding the CSG_ID to be delivered, only the CSG_ID of the CSG base station device set to allow access may be delivered. Alternatively, all CSG_IDs of the CSG base station devices having been set to allow access may be delivered.

Thereafter, if the macrocell base station device 103a does not receive a handover request message (Sf4-N), the macrocell base station device 103a continues to communicate with the mobile communication terminal 200b (Sf5). On the other hand, if the macrocell base station device 103a receives a handover request message (Sd4-Y), the macrocell base station device 103a performs handover operation (Sd6), and releases the connection with the mobile communication terminal 200b (Sd7).

Figure 23:
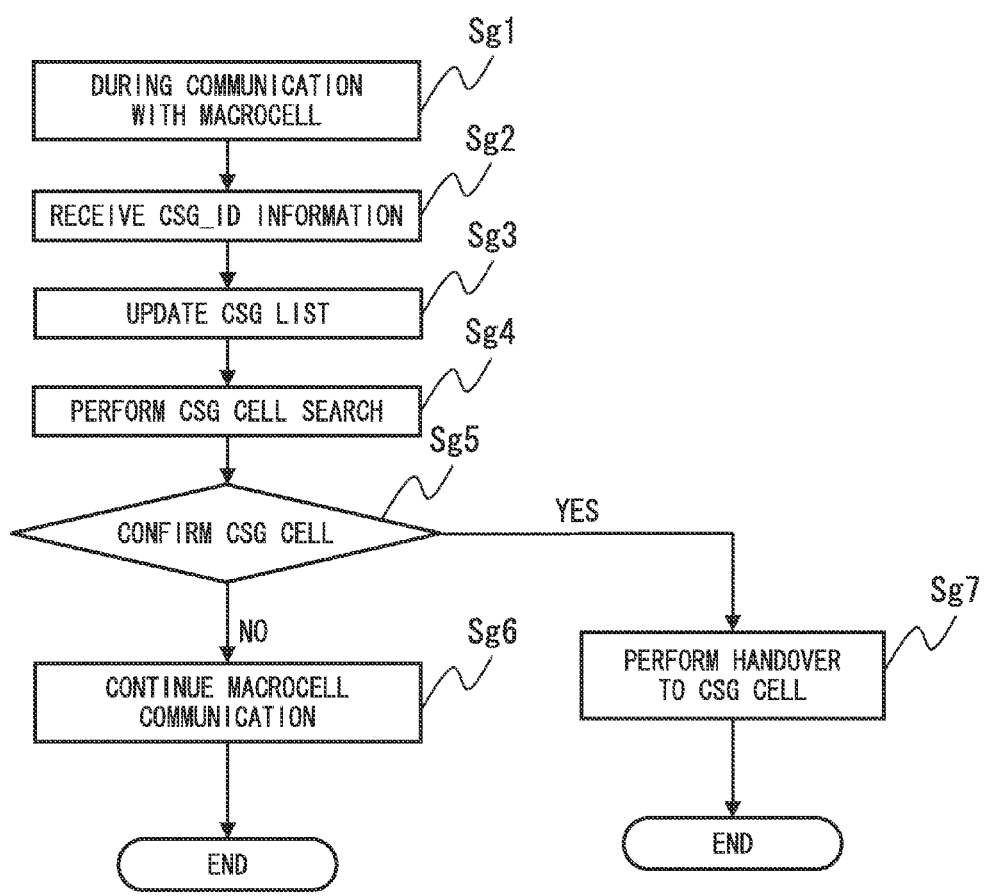
FIG. 23 is a flowchart illustrating operation of a mobile communication terminal 200b according to the third embodiment.

FIG. 23 is a flowchart illustrating operation of the mobile communication terminal 200b according to the third embodiment. The mobile communication terminal 200b is in communication with the macrocell base station device 103a (Sg1). The mobile communication terminal 200b receives the CSG_ID which has been broadcast (Sg2). Then, the mobile communication terminal 200b stores the reported CSG_ID in its CSG list, and thereby updates the CSG list (Sg3). The mobile communication terminal 200b performs cell search (Sg4), and tries to detect, based on the added CSG_ID, a reference signal transmitted from the CSG base station device 101c.

The mobile communication terminal 200b detects a reference signal transmitted from the CSG base station device 101c. Then, the mobile communication terminal 200b determines based on the reference signal whether or not the measured reception quality is equal to or higher than a predetermined threshold (Sg5). If the reception quality is lower than the predetermined threshold (Sg5-Y), the mobile communication terminal 200b continues to communicate with the macrocell base station device 103a (Sg6). On the other hand, if the reception quality is equal to or higher than the predetermined threshold (Sg5-N), the mobile communication terminal 200b transmits a handover request message to the CSG base station device 101c, and performs handover to the CSG base station device 101c (Sg7).

In the aforementioned first, second, and third embodiments, the macrocell base station device may report a common CSG_ID assigned to that area, instead of reporting an individual CSG_ID. For example, assuming that the CSG_IDs from 0123450000 to 0123459999 are assigned to an area, 012345xxxxx (xxxxx denotes a mask and indicates an arbitrary value) which represents those CSG_IDs assigned to that area may be reported. In this case, terminals store not a CSG_ID of each CSG cell, but the common CSG_ID of the group. Storing the common CSG_ID allows it to access the CSG cells present in that area. For example, since CSG_IDs of CSG cells other than the camped macrocell are reported in the third embodiment, the number of CSG_IDs to be reported and stored are great in some cases in the mobile communication system. A CSG_ID common to the group is used, thereby reducing the number of CSG_IDs to be reported and stored in the mobile communication system.

Thus, in the third embodiment, the macrocell base station device transmits to a mobile communication terminal, the CSG_IDs of the CSG base station devices in the macrocell to which that mobile communication terminal belongs, and the CSG_IDs of the CSG base station devices in a macrocell close to that macrocell. Thereby, the mobile communication terminal can communicate with the CSG base station device in the macrocell adjacent to the serving macrocell.

Additionally, in the third embodiment, even in a case where the mobile terminal device can detect reception qualities for both the macrocell base station device and the CSG cell, the mobile terminal device preferentially selects the CSG cell. For example, if a CSG is positioned close to an antenna of the macrocell, radio waves from the macrocell are stronger (due to the difference in outputs of antennas), thereby making it impossible to access the CSG cell in consideration of only the radio wave conditions in some cases. However, there are merits in such a case where it is cheaper to access the CSG cell than to access the macrocell, or a case where more bands are available to access the CSG cell than to access the macrocell, thereby achieving a better throughput and reducing the load on the macrocell. The mobile terminal device preferentially selects the CSG cell, thereby achieving those merits.

In the aforementioned third embodiment, when the macrocell base station device delivers the CSG_ID, the macrocell base station device may individually deliver the CSG_ID to only mobile communication terminals currently connected. As long as mobile communication terminals are allowed communication with the CSG cell (mobile communication terminals storing the CSG_ID corresponding to the CSG cell), those mobile communication terminals are connected to the CSG base station device at the initial stage. Since the macrocell base station device individually delivers to the connected mobile communication terminals, a mobile communication terminal not connected to the CSG cell can continue to communicate with a currently-connected CSG cell.

Even in the case where the macrocell base station device delivers the CSG_ID to the mobile station devices currently connected to the CSG base station device, there is the following effect. For example, if the mobile communication terminal moves, a CSG_ID of a CSG cell to which the mobile communication terminal has moved differs from the CSG_ID that the mobile communication terminal stores. For this reason, the mobile communication terminal performs handover to the macrocell base station device. Since the macrocell base station device is in the congested state, the macrocell base station device delivers the CSG_ID to the mobile communication terminal. Then, the mobile communication terminal updates the CSG_ID stored therein. If the delivered CSG_ID matches the CSG_ID of the CSG cell detected by cell search, the mobile communication terminal performs handover from the macrocell base station device to the CSG base station device to which the mobile communication terminal has moved. In the above case, if the mobile communication terminal preliminarily stores the CSG_ID of the CSG base station device to which the mobile communication terminal moves, it is not necessary to perform handover to the macrocell base station device, and it is possible to perform handover from the currently-connected CSG base station device directly to the CSG cell base station device to which the mobile communication terminal moves.

In the aforementioned first, second, and third embodiments, the macrocell base station device may particularly deliver the CSG_ID to part of terminals. For example, the macrocell base station device may change, for each service category, the CSG_ID to be delivered. The macrocell base station device may change, for each frequency band which is supported, the CSG_ID to be delivered. For example, the macrocell base station device delivers the CSG_ID to a mobile communication terminal supporting multiple frequency bands. In some cases, a mobile communication terminal supporting a frequency band smaller than a predetermined band cannot access the CSG cell. Even if the CSG_ID is delivered and cell search is performed, due to the frequency not supported, such a mobile terminal device cannot detect the reception quality for the CSG base station device associated with that CSG_ID or cannot perform handover thereto, in some cases. The macrocell base station device changes, for each frequency band which is supported, the CSG_ID to be delivered, thereby avoiding detecting reception quality for the macrocell base station device using the unsupported frequency for communication and performing handover operation. In other words, the CSG_ID is delivered to a mobile communication terminal supporting multiple frequency bands, so that the mobile communication terminal can find the CSG cell and perform handover thereto.

It has been explained in the aforementioned first, second, and third embodiments that when an emergency is set to the higher level device 400, or when the higher level device 400 detects an emergency, the higher level device 400 transmits a release notice to each macrocell base station device. However, configuration may be such that if an operator specifies a CSG base station device and instructs the higher level device 400 to set the specified CSG base station device to allow all mobile communication terminals communication therewith, the higher level device 400 transmits a release notice to each macrocell base station device. Additionally, in the third embodiment, an operator may specify a cell ID of a macrocell in which a CSG base station device is newly placed, and a cell ID of a macrocell close to that macrocell, and then the higher level device 400 may transmit the CSG_ID of the placed CSG base station device to the macrocell base station device associated with the specified cell ID.

Further, the higher level device 400 may automatically detect an emergency, and may automatically transmit a release notice. For example, the higher level device 400 has a function of automatically detecting congestion based on frequency of communication errors or the amount of communication information. When it is determined that the processing capacity of the higher level device 400 is exceeded, the higher level device 400 determines that congestion occurs, thereby detecting an emergency.

Moreover, explanations have been given in the third embodiment with respect to the case where the CSG_IDs of the CSG base station devices having been set to allow access are transmitted. If that setting is cancelled, however, the CSG_ID of the CSG base station device released from the setting may be transmitted to a macrocell close to the macrocell in which that CSG base station device is placed.

In the aforementioned first, second, and third embodiments, the higher level device 400 may transmit a release notice to each macrocell base station device when the higher level device 400 receives from a CSG base station device, a notice indicating that the CSG base station device is set to allow all mobile communication terminals communication therewith. Additionally, in the aforementioned first and second embodiments, the higher level device 400 obtains the state of each CSG base station device, and if the CSG base station device is set to allow all mobile communication terminals communication therewith, the higher level device 400 may transmit a release notice to each macrocell base station device. Further, in the aforementioned first and second embodiments, not the higher level device 400, but each macrocell base station device may perform those setting, reception of instructions, detection, and acquisition of a state, according to which the CSG_ID is reported using cell broadcast service. Moreover, in the aforementioned first and second embodiments, the number of the higher level devices 400 has been one, but may be two or more.

In the aforementioned first, second, and third embodiments, a period and frequency for the macrocell base station device to deliver the CSG_ID using cell broadcast service may be such that the CSG base station device having been set to allow all mobile communication terminals access thereto makes delivery for a certain period, once a day. Alternatively, the period and frequency may be other predetermined period and frequency, such that a delivery is made once a day while an emergency is set, or a delivery is made once a day, for a given period after any CSG base station device is set to allow all mobile communication terminals access thereto or that setting is cancelled. Alternatively, a period and frequency set by an operator may be used.

It has been explained in the aforementioned first and second embodiments that the macrocell base station device transmits the CSG_ID of the CSG base station device using cell broadcast service, similarly to the third embodiment, thereby reporting to the mobile communication terminals that CSG base station devices positioned within the coverage area of the macrocell base station device are set to allow all mobile communication terminals communication therewith. However, not only the CSG base station devices positioned within the coverage area of the macrocell base station device, but also CSG base station devices positioned within the coverage area (neighboring cell) of a neighboring macrocell base station device, may be reported similarly. In this case, any of the higher level device 400 and the neighboring macrocell base station device may report to the macrocell base station device, the CSG_IDs of the CSG base station devices positioned within the neighboring cell. Further, not only CSG base station devices positioned in the neighboring cell, but also CSG base station devices positioned in a cell selected by an operator or a predetermined cell, may be reported.

In the aforementioned first, second, and third embodiments, the mobile communication terminal may store the CSG_ID that is stored in the CSG list storing unit 231 while being correlated to the broadcast flag "1", until an instruction to delete is received from the macrocell base station device. Alternatively, the mobile communication terminal may delete the CSG_ID if the following conditions are met. Deletion is to be performed if the mobile communication terminal moves to another cell, or to another cell in which that CSG base station device is not placed. When the macrocell base station device reports the CSG_IDs using cell broadcast service, the macrocell base station device reports, in addition to the CSG_IDs, information indicating a predetermined area (cell) or an area set by an operator, and if the mobile communication terminal moves out of that area, the mobile communication terminal deletes that CSG_ID. Deletion is performed if a predetermined deadline (such as the date) or a validity period (such as the number of days) is passed. Here, this validity period may be a period from the time the CSG_ID is reported using cell broadcast service or a period from the time the mobile communication terminal moves to another cell or moves out of the area. Alternatively, not only the CSG_ID that is stored while being correlated to the broadcast flag "1", but also the CSG_ID that is stored while being correlated to the broadcast flag "0", may be deleted. This is because even if the CSG_ID that is stored while being correlated to the broadcast flag "0" is deleted, that CSG_ID is reported through the dedicated channel and restored.

In the aforementioned first, second, and third embodiments, when the CSG_ID transmitted using cell broadcast service is received or when the CSG list stored by the CSG list storing unit 231 is updated, the mobile communication terminal may display on a display of the UI unit 24, an image that notifies of the reception of the CSG_ID or the update of the CSG list. The image to be notified may be an image such as an icon or a character string. Alternatively, the notice may be given by sound or vibrating a body of the mobile communication terminal, instead of an image.

In the aforementioned first, second, and third embodiments, the CSG list storing unit 231 of the mobile communication terminal may be a storage medium such as a flash memory, which is included in the mobile communication terminal, or a storage medium such as a USIM (universal subscriber identity module) card or an SD card, which is included in a module detachable from the mobile communication terminal.

A computer-readable recording medium may store a program for implementing the functions of: the signal processor 12 shown in FIG. 8; the signal processor 22 shown in FIG. 11; and the signal processor 12a shown in FIG. 16, so that a computer system reads and executes the program stored in the recording medium to execute the operation of each unit. Here, the "computer system" includes OS and hardware, such as a peripheral device.

The "computer system" includes home page provision environments (or display environments) in a case where a WWW system is used.

The "computer-readable recording medium" indicates a storage device, which includes a portable medium such as a flexible disc, a magneto-optical disc, a ROM, and a CD-ROM, and a storage device such as a hard disk built in the computer system. Additionally, the "computer-readable recording medium" may include a medium that dynamically stores a program for a short period of time, such as a communication line used when a program is transmitted via a network such as the Internet or a communication line such as a telephone line. Further, the "computer readable recording medium" may include a medium that stores a program for a predetermined period of time, such as a volatile memory built in a computer system serving as a server or client when the program is transmitted via a network such as the Internet or a communication line such as a telephone line. Moreover, the program may be a program for implementing part of the aforementioned functions, or a program that can implement the aforementioned functions in combination with a program already recorded in the computer system.

Embodiments of the present invention have been explained above in detail with reference to the drawings. However, the specific configuration is not limited thereto. Various modifications may be made without departing from the scope of the present invention.

INDUSTRIAL APPLICABILITY

The present invention can be used for a mobile communication system in which a cellular phone device is regarded as a terminal device.

DESCRIPTION OF REFERENCE NUMERALS

10: transmitter
11: receiver
12, 12a: signal processor
13: storing unit
14: network accessor
15: antenna
20: transmitter
21: receiver
22: signal processor
23: storing unit
24: UI unit
25: antenna
100a, 100m: macrocell base station device
101a, 101n: CSG base station device
121: CSG update detector
122, 122a: CSG managing unit
123: dedicated channel processor
124: broadcast channel processor
131: CSG storing unit
201a, 201k: mobile communication terminal
221: communication processor
222: accessed base station determining unit
223: CSG list managing unit
231: CSG list storing unit
300: network
400: higher level device

The invention claimed is:

1. A mobile communication system comprising:
a plurality of mobile communication terminals; and
a first base station device configured to wirelessly communicate with the plurality of mobile communication terminals,
wherein the first base station device comprises:
a detector configured to detect that a second base station device allowing only a particular mobile communication terminal access is set to allow all the plurality of mobile communication terminals access; and
a transmitter configured to transmit, to at least one mobile communication terminal among the plurality of mobile communication terminals, identification information of the second base station device in a case that the detector detects that the second base station device is set to allow all the plurality of mobile communication terminals access, and
wherein a mobile communication terminal among the plurality of mobile communication terminals comprises:
a receiver configured to receive the identification information transmitted by the transmitter of the first base station device; and
a processor configured to communicate with the second base station device in a case that the receiver receives the identification information, and in a case that the mobile communication terminal positions within a coverage area of the second base station device identified by the identification information received by the receiver.

2. The mobile communication system according to claim 1, wherein the first base station device is configured to report to the plurality of mobile communication terminals that a setting that causes the second base station device to allow all the plurality of mobile communication terminals access is cancelled, by transmitting using cell broadcast service, the identification information of the second base station device released from the setting and information indicating cancellation.

3. The mobile communication system according to claim 1, wherein in a case that the first base station device transmits using cell broadcast service, the identification information of the second base station device, the first base station device is configured to transmit using the cell broadcast service, the identification information of the second base station device set to allow all the plurality of mobile communication terminals access, among all of second base station devices positioned within a coverage area of the first base station device.

4. The mobile communication system according to claim 1, wherein each of the plurality of mobile communication terminals is configured to distinguishably store identification information of a second base station device to which the mobile communication terminal is allowed access, and the identification information of the second base station device transmitted using the cell broadcast service.

5. The mobile communication system according to claim 1, wherein the second base station device, which is reported by the first base station device as being set to allow all the plurality of mobile communication terminals access, is any one of a second base station device positioned within a coverage area of the first base station device, and a second base station device positioned within a coverage area of the first base station device and a base station device adjacent to the first base station device.

6. The mobile communication system according to claim 1, wherein
the first base station device further comprises a storing unit which stores the identification information of the second base station device, the identification information being correlated with one of first and second flags, and
the transmitter of the first base station device is configured to transmit, to all of the plurality of mobile communication terminals, the identification information of the second base station device, in a case that the identification information stored in the storing unit correlates with the first flag, and transmit, to one of the plurality of mobile communication terminals, the identification information of the second base station device, in a case that the identification information stored in the storing unit correlates with the second flag.

7. The mobile communication system according to claim 1, wherein
the detector of the first base station device is configured to detect that the second base station device allowing only a particular mobile communication terminal access and a third base station device allowing only the particular mobile communication terminal access are set to allow all the plurality of mobile communication terminals access, the transmitter of the first base station device is configured to transmit, to the at least one mobile communication terminal among the plurality of mobile communication terminals, the identification information in a case that the detector detects that the second and third base station devices are set to allow all the plurality of mobile communication terminals access, and
the identification information is common to the second and third base station devices.

8. The mobile communication system according to claim 1, wherein
the transmitter of the first base station device is configured to transmit the identification information of the second base station device by using cell broadcast service.

9. The mobile communication system according to claim 1, wherein
the processing unit is configured to communicate with the second base station device by using the identification information received from the first base station device, the processing unit performing the communication with the second base station device without receiving the identification information from the second base station device.

10. A base station device configured to wirelessly communicate with a plurality of mobile communication terminals, the base station device comprising:
a detector configured to detect that another base station device allowing only a particular mobile communication terminal access is set to allow all the plurality of mobile communication terminals access; and
a transmitter configured to transmit, to at least one mobile communication terminal among the plurality of mobile communication terminals, identification information of the another base station device in a case that the detector detects that the another base station device is set to allow all the plurality of mobile communication terminals access, the transmission of the identification information being performed to make a mobile communication terminal among the plurality mobile communication terminals communicate with the another base station in a case that the mobile communication terminal positions within a coverage area of the another base station device identified by the identification information.

11. A mobile communication terminal comprising:
a receiver configured to receive identification information, the identification information being transmitted, from a first base station device, in a case that the first base station device detects that a second base station device allowing only a particular mobile communication terminal access is set to allow all the plurality of mobile communication terminals access; and
a processor configured to communicate with the second base station device in a case that the receiver receives the identification information, and in a case that the mobile communication terminal positions with in a coverage area of the second base station device identified by the identification information received by the receiver.

* * * * *